US012756128B2

(12) United States Patent
Gao

(10) Patent No.: US 12,756,128 B2
(45) Date of Patent: Oct. 6, 2026

(54) FIXED ELECTRICAL ACCESSORY WITH PROTECTIVE SHELL

(71) Applicant: Zhejiang Shengyu Electrical Co., Ltd

(72) Inventor: Tuo Gao, Lishui (CN)

(73) Assignee: ZHEJIANG SHENGYU ELECTRICAL CO., LTD., Lishui City (CN)

( * ) Notice: Subject to any disclaimer, the term of this patent is extended or adjusted under 35 U.S.C. 154(b) by 340 days.

(21) Appl. No.: 18/433,342

(22) Filed: Feb. 5, 2024

(65) Prior Publication Data

US 2024/0429638 A1 Dec. 26, 2024

(30) Foreign Application Priority Data

Jun. 25, 2023 (CN) ......................... 202321613366.7

(51) Int. Cl.
*H01R 13/447* (2006.01)
*H01R 24/76* (2011.01)

(52) U.S. Cl.
CPC ........... *H01R 13/447* (2013.01); *H01R 24/76* (2013.01)

(58) Field of Classification Search
CPC .............................. H01R 13/447; H01R 24/76
USPC ........................................................... 174/66
See application file for complete search history.

(56) References Cited

U.S. PATENT DOCUMENTS 6,923,663 B2 * 8/2005 Oddsen ................ H01R 25/006 439/535
2017/0214188 A1 * 7/2017 Smith .................... H05B 45/00

* cited by examiner

*Primary Examiner* — Timothy J Thompson
*Assistant Examiner* — Guillermo J Egoavil

(57) ABSTRACT

The present application discloses a fixed electrical accessory with protective shell, which includes an electrical accessory body, a middle frame for connecting the electrical accessory body and a cover plate for protecting the electrical accessory body. The middle frame is detachably connected to the cover plate. A plurality of clip units is provided at a lateral side of the cover plate, and a plurality of locking slots corresponding to the plurality of clip units is provided at a lateral side of the middle frame, wherein the plurality of clip units cooperate with the plurality of locking slots respectively to achieve fastening. At least one groove is provided at the lateral side of the cover plate for facilitating disassembly of the middle frame and the cover plate.

8 Claims, 4 Drawing Sheets

FIXED ELECTRICAL ACCESSORY WITH PROTECTIVE SHELL

CROSS-REFERENCE TO RELATED APPLICATIONS

The present application claims priority to Chinese Patent Application No. 202321613366.7, filed on Jun. 25, 2023, the entire contents of which are hereby incorporated by reference.

TECHNICAL FIELD

The present application relates to the technical field of electrical accessories, in particular to a fixed electrical accessory with protective shell.

BACKGROUND

Fixed electrical accessories with protective shell, are generally used for household and similar purposes, or in electrical equipment. Protective shells are used for electrical safety protection and decoration of fixed electrical accessories which are often fixedly installed on a wall and a panel of a device, and may include switches, sockets, or combinations of them, for mechanical connecting, electrical connecting and disconnecting of electrical circuits. During use, the operator will frequently come into contact with a surface of the fixed electrical accessory, so that the electrical accessory is generally provided with a cover plate. On one hand, the cover plate can isolate components inside the electrical accessory that may pose a risk of electric shock, achieving electrical safety protection; on the other hand, the cover plate can cover the installation frame, achieving a beautiful decorative effect. Moreover, the cover plate needs to be easy to install and remove.

At present, the fixed electrical accessories with protective shell on the market are generally consisted of a middle frame and a cover plate, wherein the middle frame is its main structure, used to fix electrical accessories and the cover plate; and, the cover plate is fastened onto the middle frame for electrical safety protection and appearance decoration. Between the middle frame and the cover plate, a single clip and a single locking slot are used to lock each other, thereby fixing the cover plate. During the installation process, it is necessary to overcome a large amount of friction to install the cover plate in place, and during the disassembly process, it is also necessary to overcome a large amount of friction to remove the cover plate, and even damage the clip or locking slot during the disassembly process, resulting in the cover plate not being reliably installed again, posing a safety hazard.

In order to solve the above problem, some fixed electrical accessories with protective shell use wider clip to prevent the clip from being broken and the locking slot from being damaged during the disassembly process. However, wider clip may require greater force for installation and disassembly, and some products do not effectively solve the problem of clip and locking slot being vulnerable after widening the clip, which still poses safety hazards.

SUMMARY

An object of the present application is to provide a fixed electrical accessory with protective shell to overcome the problem in the background.

To achieve the above object, a technical solution of the present application is:

A fixed electrical accessory with protective shell, including an electrical accessory body, a middle frame for connecting the electrical accessory body and a cover plate for protecting the electrical accessory body, the middle frame being detachably connected to the cover plate, a plurality of clip units being provided at a lateral side of the cover plate, a plurality of locking slots corresponding to the plurality of clip units being provided at a lateral side of the middle frame, the plurality of clip units cooperating with the plurality of locking slots respectively to achieve fastening, and at least one groove being provided at the lateral side of the cover plate for facilitating disassembly of the middle frame and the cover plate.

In some embodiments, each of the plurality of clip units includes at least two clips arranged side by side, and each clip is L-shaped; and the at least two clips cooperate with the locking slot to achieve fastening.

In some embodiments, the cover plate includes a first panel and a first flange perpendicular to the first panel, the first panel and the first flange cooperatively form a chamber for accommodating the middle frame, and the clips are provided on an inner wall of the first flange.

In some embodiments, a corner of each clip is arc-shaped.

In some embodiments, the middle frame includes a second panel and a second flange perpendicular to the second panel, and the locking slots are provided at an outer side of the second flange.

In some embodiments, the second flange is L-shaped, and the locking slot is L-shaped.

In some embodiments, the electrical accessory body includes a base and a protrusion installed on the base for setting switch buttons or sockets.

In some embodiments, the middle frame and the cover plate each define a through hole corresponding to the protrusion, and the protrusion extends through the through holes of the middle frame and the cover plate sequentially to an outer side of the cover plate.

In some embodiments, mounting plates are provided at two sides of the base, respectively, and each mounting plate is connected to the middle frame by screws.

Compared with the prior art, the present application has the following beneficial effects.

1) In the present fixed electrical accessory with protective shell, the protective shell has several clip units provided at lateral sides of the cover plate and several locking slots provided at lateral sides of the middle frame, wherein each locking slot is matched with and fastened to the clips of one corresponding clip unit to achieve the installation of the middle frame and cover plate, a friction force to be overcome during installation is small and thus a reliability of installation is improved;
2) During the disassembly process of the present fixed electrical accessory with protective shell, the cover plate is pried at the groove to deform, making its lateral side deform into an arc shape, causing the clips of the clip unit to detach from the corresponding locking slot at different times, thereby reducing the friction between the clips of the clip unit and the corresponding locking slot, finally reducing the force required to disassemble the cover plate, improving the reliability of disassembly, and solving the problem of vulnerability between the clips and locking slot.

Figure 1:
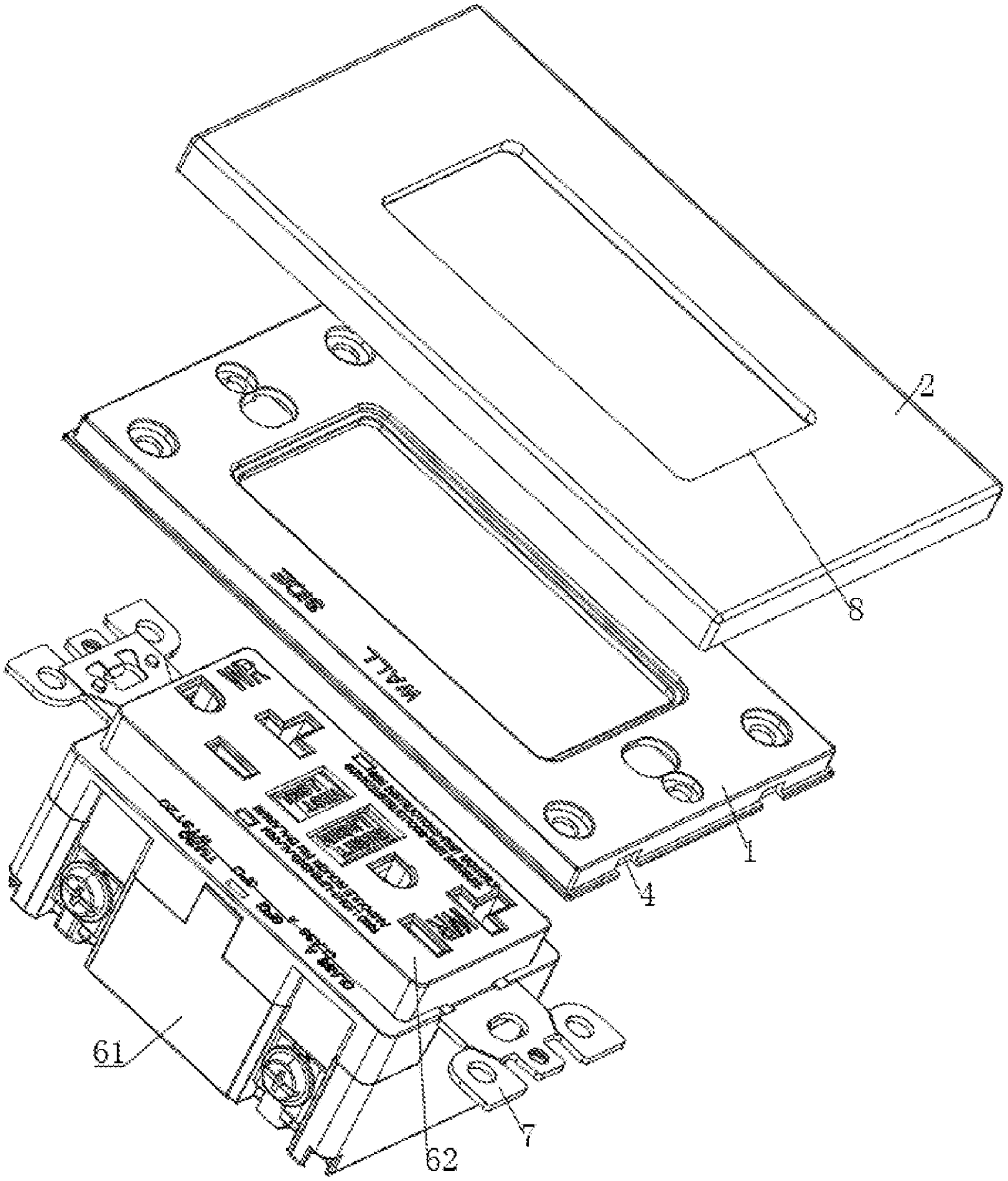
FIG. 1 is a schematic view of a fixed electrical accessory with protective shell according to an embodiment of the present application.
Figure 2:
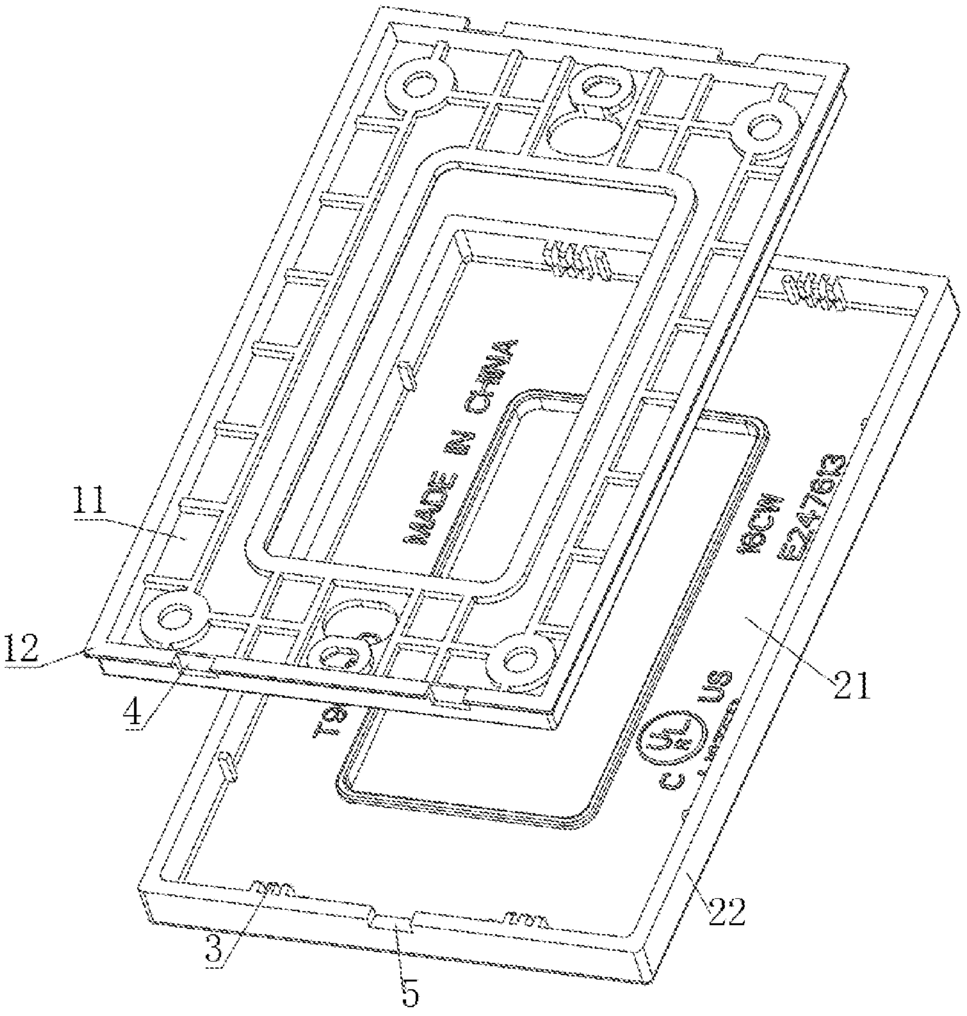
FIG. 2 is a schematic view of a middle frame and a cover plate of the fixed electrical accessory with protective shell of the present application.
Figure 3:
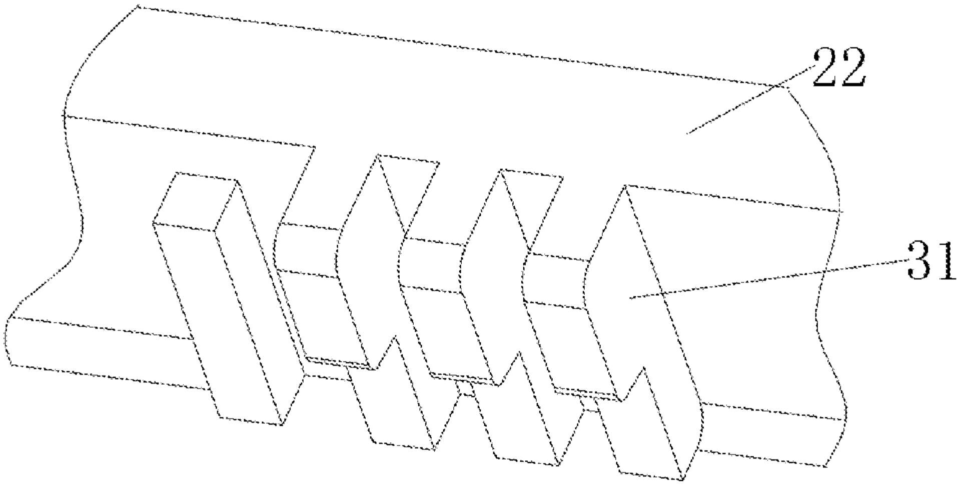
FIG. 3 is a schematic view of a clip and a first flange of the fixed electrical accessory with protective shell of the present application.

1, middle frame; 11, second panel; 12, second flange;
2, cover plate; 21, first panel; 22, first flange;
3, clip unit; 31, clip;
4; locking slot;
5, groove;
6, electrical accessory body; 61, base; 62, protrusion;
7, mounting plate;
8, through hole.

DESCRIPTION OF THE EMBODIMENTS

In order to make the objects, technical solutions and advantages of the embodiments of the present application clearer, the technical solutions according to the embodiments of the present application will be clearly and completely described with reference to drawings in the embodiments of the present application. Apparently, the embodiments described are merely some embodiments, but not all of the embodiments of the present application. All other embodiments obtained by ordinary persons skilled in the art according to the embodiments of the present application without creative efforts shall fall within the protection scope of the present application.

It should be noted that when a component is referred to as “connected” to another component, it can be connected to the another component directly or there may be a middle component connected therebetween. Unless otherwise defined, all technical and scientific terms used in this application have the same meanings as those commonly understood by those skilled in the art. The terms used in the specification of this application are only for the purpose of describing specific embodiments and are not intended to limit this application.

As shown in FIG. 1 to FIG. 5, a fixed electrical accessory with protective shell includes an electrical accessory body 6, a middle frame 1 for connecting the electrical accessory body 6 and a cover plate 2 for protecting the electrical accessory body 6, wherein the middle frame 1 is detachably connected to the cover plate 2.

The cover plate 2 is provided with a plurality of clip units 3 distributed at a lateral side thereof, and a plurality of locking slots 4 corresponding the plurality of clip units 3 are defined at a lateral side of the middle frame 1. Each of the clip units 3 and one corresponding locking slot 4 cooperate with each other to achieve fastening. Further, at least one groove 5 is defined at the lateral side of the cover plate 2 for facilitating disassembly of the middle frame 1 and the cover plate 2.

Each clip unit 3 includes at least two clips 31 arranged side by side, and each clip 31 is L-shaped. The at least two clips 31 of the clip unit 3 and the corresponding locking slot 4 cooperate with each other to achieve fastening.

It should be noted that both the middle frame 1 and the cover plate 2 are made of deformable plastic materials. In this way, the clip unit 3 of the cover plate 2 cooperate with and are fastened into the locking slot 4 of the middle frame 1 through deformation, which is more convenient for installation. One side of the electrical accessory body 6 is fixed to a wall or a panel of a device, and an opposite side of the electrical accessory body 6 is fixed to the middle frame 1 and protected by the cover plate 2 for decoration.

Taking FIG. 1 as an example, both the middle frame 1 and the cover plate 2 are rectangular-shaped. However, specific shapes of the middle frame 1 and the cover plate 2 are not limited, which may be circular, triangular, or irregular. Positions of the clip unit 3 and the locking slot 4 are not limited, which may be respectively provided on any lateral side of the cover plate 2 and the middle frame 1. The clip unit 3 is fixedly connected to the cover plate 2. Specific numbers of clip units 3 and locking slots 4 are not limited, which may be set according to actual needs. Fox example, in this embodiment, the clip units 3 are four in number and arranged at left and right sides of the cover plate 2, respectively; the locking slots 4 are four in number and arranged at left and right sides of the middle frame 1, respectively. The position and number of the groove 5 are not limited, which may be formed at any lateral side of the cover plate 2. For example, in this embodiment, the groove 5 is one in number, and is formed at the left side of the cover plate 2 and located between two clip units 3.

The number of the clips 31 of the clip unit 3 is not limited. However, to ensure stability, the clip unit 3 has two or more clips 31. For example, in this embodiment, each clip unit 3 includes three clips 31 which are arranged side by side, and a certain gap (such as 2 mm) is defined between neighboring clips 31. The L-shaped clip 31 includes a first arm and a second arm that are integrally formed and perpendicular to each other. The first arm is fixedly connected to an inner wall of a first flange 22, wherein the first arm and the first flange 22 may be formed integrally or separately; and the second arm is perpendicular to the first flange 22. Specific shape of the clip 31 is not limited, it may be any shape that can cooperate with the locking slot 4 to achieve fastening.

When installing the middle frame 1 and the cover plate 2, each clip unit 3 is fastened into the corresponding locking slot 4 through deformation, and the numbers of the locking slots 4 and the clip units 3 are not only one, distributed on lateral sides of the middle frame 1 and the cover plate 2, respectively. Each clip unit 3 includes multiple clips 31, which reduces the friction force that needs to be overcome and improves the reliability of installation. At the same time, during the disassembly process, tools such as flat plates or gongs are used to pry the cover plate 2 at the groove 5, which causes the lateral side of the cover plate 2 to deform into an arc shape, causing the clips 31 to detach from the corresponding locking slot 4 at different times (if the clips 31 detach from the slot 4 at the same time, the frictional force is maximum), thereby reducing the frictional force between the clip units 3 and locking slots 4, reducing the force required to disassemble the cover plate 2 and improving the reliability of disassembly.

In an embodiment, the cover plate 2 includes a first panel 21 and a first flange 22 perpendicular to the first panel 21. The first panel 21 and the first flange 22 cooperatively form a chamber for accommodating the middle frame 1, and the clips 31 are provided on an inner wall of the first flange 22.

Specifically, in this embodiment, the first panel 21 and the first flange 22 are formed integrally as one piece. Alternatively, the first panel 21 and the first flange 22 may be formed separately and then assembled together.

In an embodiment, a corner of each clip 31 is arc-shaped.

Specifically, corners of the second arm of each clip 31 are arc-shaped, which reduces friction during the installation and disassembly of the middle frame 1 and cover plate 2, making the middle frame 1 and cover plate 2 be easier to install and disassembly.

In an embodiment, the middle frame 1 includes a second panel 11 and a second flange 12 perpendicular to the second panel 11, wherein the locking grooves 4 are provided on an outer side of the second flange 12.

Specifically, the second panel 11 and the second flange 12 are formed integrally as one piece. Alternatively, the second panel 11 and the second flange 12 may be formed separately and then assembled together.

In an embodiment, the second flange 12 is L-shaped, and the locking slot 4 is L-shaped.

Specifically, the shape of the second flange 12 is not limited. In this embodiment, the second flange 12 includes a first plate fixed onto the second panel 11 vertically and a second plate perpendicular to the first plate (the first plate and the second panel 11 are formed integrally or separately, and the first plate and the second plate are formed integrally or separately), and the second plate extends towards an outer side of a periphery of the second panel 11. The shape of the locking slot 4 is not limited, which may be any shape that can cooperate with the clip 31 to achieve fastening.

Figure 4:
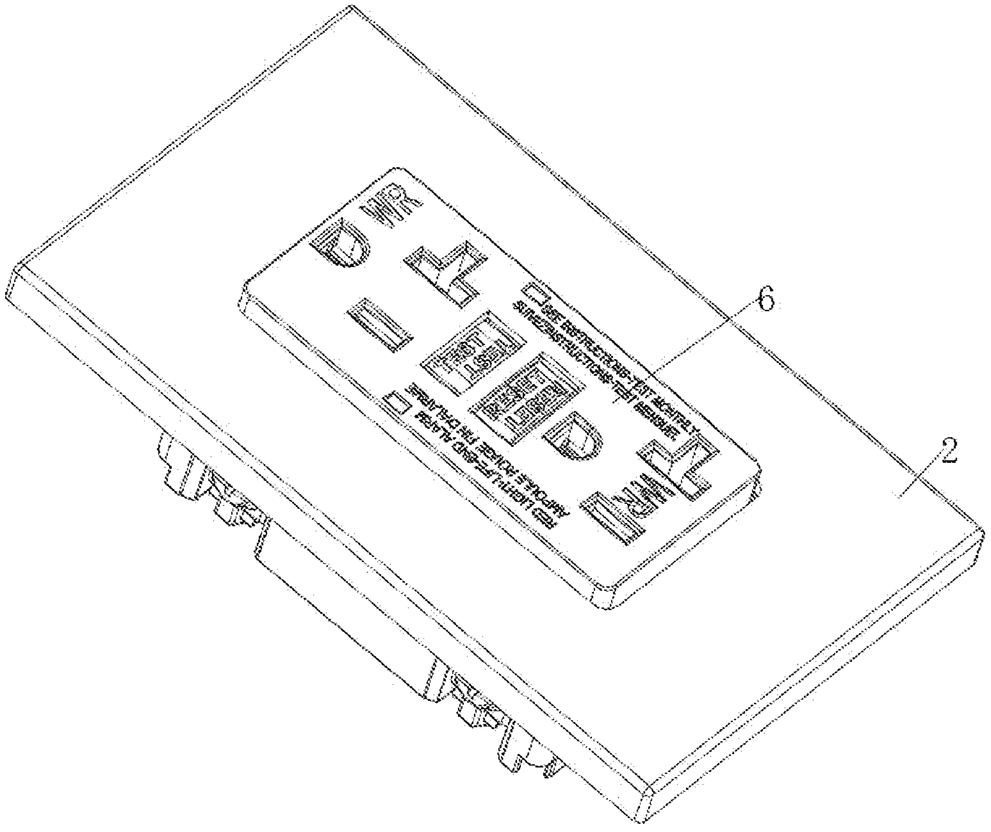
FIG. 4 shows the fixed electrical accessory with protective shell of the present application from a first aspect.
Figure 5:
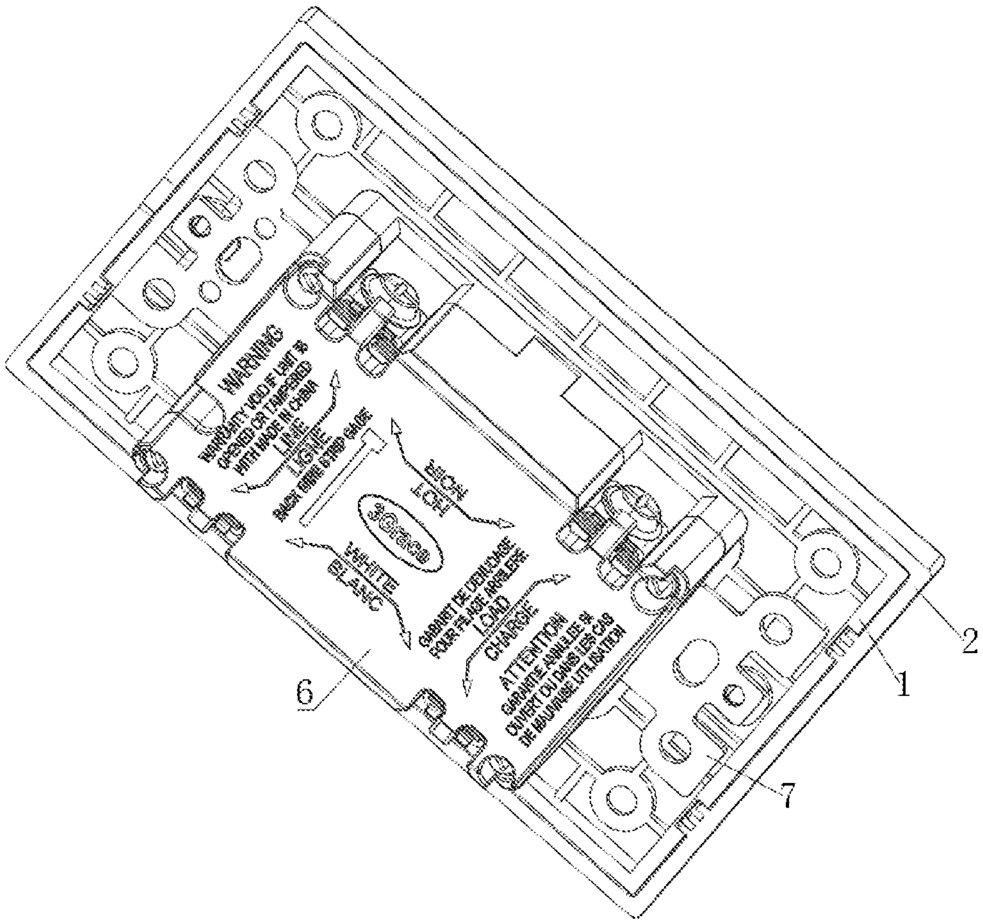
FIG. 5 shows the fixed electrical accessory with protective shell of the present application from a second aspect.

As shown in FIG. 1, FIG. 4 and FIG. 5, in an embodiment, the electrical accessory body 6 includes a base 61 and a protrusion 62 installed on the base 61 for setting switch buttons or sockets.

In an embodiment, the middle frame 1 and the cover plate 2 each define a through hole 8 which corresponds to the protrusion 62. The protrusion 62 extends through the through holes 8 of the middle frame 1 and the cover plate 2 sequentially to the outer side of the cover plate 2.

Specifically, the base 61 is fixedly installed on the wall or the panel. In this embodiment, the protrusion 62 is fixedly connected to the base 61, and an installation surface of the protrusion 62 and the base 61 is smaller than the surface of the base 61, and thus an excess area at the top of the base 61 may be used to place the middle frame 1.

In an embodiment, mounting plates 7 are provided at two sides of the socket 61, respectively, and each mounting plate 7 is connected to the middle frame 1 by screws.

Specifically, two mounting plates 7 are fixedly installed on two sides of the socket 61, respectively. Specific positions of the mounting plates 7 are not limited, and a connection manner between the mounting plates 7 and the middle frame 1 is also not limited, other fixing methods may also be used. When the electrical accessory body 6 is installed on the wall or the panel, it is fixed to the wall or panel through the mounting plates 7, using screws or other fixing manners.

A working principle of the fixed electrical accessory with protective shell is as follows:

When installing the middle frame 1 and cover plate 2, each locking slot 4 cooperates with the clips 31 of the corresponding clip unit 3 through deformation, thereby achieving fastening. The locking slots 4 and the clip units 3 are not only one, distributed on the lateral sides of the middle frame 1 and cover plate 2, respectively. Each clip unit 3 includes multiple clips 31, which reduces the friction force to be overcome and improves the reliability of installation. At the same time, during the disassembly process, tools such as flat plates or gongs are used to pry cover plate 2 at the groove 5, which causes the lateral side of the cover plate 2 to deform into an arc shape, causing the clips 31 of each clip unit 3 to detach from the corresponding locking slot 4 at different times, thereby reducing the friction force between the clip unit 3 and the corresponding locking slot 4, reducing the force required to disassemble the cover plate 2 and improving the reliability of disassembly.

When installing the electrical accessory body 6, the middle frame 1 and the cover plate 2, the protrusion 62 of the electrical accessory body 6 extends through the through holes 8 of the middle frame 1 and cover plate 2 in turn to the outside of the cover plate 2, so as to achieve protective decoration of the electrical accessory body 6, connect the base 61 of the electrical accessory body 6 to the middle frame 1, and fix the base 61 to the wall or the panel of the device.

In the present fixed electrical accessory with protective shell, the protective shell has several clip units provided at lateral sides of the cover plate and several locking slots provided at lateral sides of the middle frame, wherein each locking slot is matched with and fastened to the clips of one corresponding clip unit to achieve the installation of the middle frame and cover plate, a friction force to be overcome during installation is small and thus a reliability of installation is improved. During the disassembly process of the present fixed electrical accessory with protective shell, the cover plate is pried at the groove to deform, making its lateral side deform into an arc shape, causing the clips of the clip unit to detach from the corresponding locking slot at different times, thereby reducing the friction between the clips of the clip unit and the corresponding locking slot, finally reducing the force required to disassemble the cover plate, improving the reliability of disassembly, and solving the problem of vulnerability between the clips and locking slot.

Technical features of the above embodiments may be combined in any way. To make the description concise, all possible combinations of the technical features in the above embodiments have not been described. However, as long as there is no contradiction in the combination of these technical features, they should be considered within the scope of this disclosure.

The above only describe some embodiments of the present application in details, which should not be understood as a limitation to the scope of the patent disclosure. It should be pointed out that for any one of those ordinary skilled in the art, within the scope of the disclosed technology, technical solutions that are equivalently replaced or modified according to the technical solutions and inventive concepts of the present application should fall within the scope of the present application. Therefore, a protection scope of this patent application should be based on the attached claims.

What is claimed is:

1. A fixed electrical accessory with protective shell, comprising:

an electrical accessory body, a middle frame for connecting the electrical accessory body and a cover plate for protecting the electrical accessory body, the middle frame being detachably connected to the cover plate, a plurality of clip units being provided at a lateral side of the cover plate, a plurality of locking slots corresponding to the plurality of clip units being provided at a lateral side of the middle frame, the plurality of clip units cooperating with the plurality of locking slots respectively to achieve fastening, and at least one groove being provided at the lateral side of the cover plate for facilitating disassembly of the middle frame and the cover plate;

wherein the middle frame comprises a second panel and a second flange perpendicular to the second panel, and the locking slots are provided at an outer side of the second flange.

2. The fixed electrical accessory with protective shell according to claim 1, wherein each of the plurality of clip units comprises at least two clips arranged side by side, and each clip is L-shaped; and the at least two clips cooperating with the locking slot to achieve fastening.

3. The fixed electrical accessory with protective shell according to claim 2, wherein the cover plate comprises a first panel and a first flange perpendicular to the first panel, the first panel and the first flange cooperatively form a chamber for accommodating the middle frame, and the clip units are provided on an inner wall of the first flange.

4. The fixed electrical accessory with protective shell according to claim 2, wherein a corner of each clip is arc-shaped.

5. The fixed electrical accessory with protective shell according to claim 1, wherein the second flange is L-shaped, and the locking slot is L-shaped.

6. The fixed electrical accessory with protective shell according to claim 1, wherein the electrical accessory body comprises a base and a protrusion installed on the base for setting switch buttons or sockets.

7. The fixed electrical accessory with protective shell according to claim 6, wherein the middle frame and the cover plate each define a through hole corresponding to the protrusion, and the protrusion extends through the through holes of the middle frame and the cover plate sequentially to an outer side of the cover plate.

8. The fixed electrical accessory with protective shell according to claim 6, wherein mounting plates are provided at two sides of the base, respectively, and each mounting plate is connected to the middle frame by screws.

* * * * *